(12) United States Patent
Stacey (10) Patent No.: US 9,460,399 B1
(45) Date of Patent: Oct. 4, 2016

(54) DYNAMIC EVENT DRIVEN STORAGE SYSTEM OPTIMIZATION

(71) Applicant: EMC Corporation, Hopkinton, MA (US)

(72) Inventor: Christopher Stacey, Christchurch (NZ)

(73) Assignee: EMC Corporation, Hopkinton, MA (US)

( * ) Notice: Subject to any disclaimer, the term of this patent is extended or adjusted under 35 U.S.C. 154(b) by 346 days.

(21) Appl. No.: 14/143,970

(22) Filed: Dec. 30, 2013

(51) Int. Cl.
*G06F 15/18* (2006.01)
*G06N 99/00* (2010.01)
*G06N 3/08* (2006.01)

(52) U.S. Cl.
CPC ............. *G06N 99/005* (2013.01); *G06N 3/08* (2013.01)

(58) Field of Classification Search
CPC ............................ G06Q 10/06; H04L 41/147
USPC ...................................................... 706/12, 45
See application file for complete search history.

(56) References Cited

U.S. PATENT DOCUMENTS

| | | | |
|---|---|---|---|
| 7,089,281 B1 * | 8/2006 | Kazemi | G06F 3/0613 709/203 |
| 7,107,534 B1 | 9/2006 | de Jong et al. | |
| 7,260,628 B2 | 8/2007 | Yamamoto et al. | |
| 7,523,359 B2 | 4/2009 | Richards et al. | |
| 8,953,623 B1 * | 2/2015 | Eyada | H04L 47/125 370/401 |
| 2002/0191311 A1 * | 12/2002 | Ulrich | G06F 17/30067 360/1 |
| 2009/0059793 A1 * | 3/2009 | Greenberg | H04L 41/0803 370/235 |
| 2015/0295856 A1 * | 10/2015 | Karthikeyan | H04L 65/80 370/230 |

OTHER PUBLICATIONS

Mansharamani, Performance Testing, 2011, pp. 1-24.*

* cited by examiner

*Primary Examiner* — David Vincent
(74) *Attorney, Agent, or Firm* — BainwoodHuang (57) ABSTRACT

An improved technique involves proactively adjusting data storage system configuration in response to detecting external events. The improved technique predicts load changes based on historical correlations between events and load changes and directs an administrator to modify system configurations to prepare for the predicted changes in load. Advantageously, the improved technique enables administrators to better prepare for changes in load brought about by external events and thus to better maintain required service levels. Further, the improved technique reduces need for stressful and urgent responses by system administrators.

22 Claims, 5 Drawing Sheets

DYNAMIC EVENT DRIVEN STORAGE SYSTEM OPTIMIZATION

BACKGROUND

Data storage systems are arrays of storage drives (e.g., disk drives, solid state drives, and the like) and storage processors configured to store and provide access to large amounts of data. Data storage systems are often subject to sudden changes in demand for access to the data they store. For example, suppose that an online retailer maintains order and account information in a data storage system. Data access requests to the data storage system may spike in response to certain events, e.g., a launch of a new product. Such spikes may cause disk drives and storage processors to become overly burdened, which can lead to delays in servicing user requests or even to service outages.

Some data storage systems allow administrators to make adjustments to how storage and processing resources are distributed throughout the systems and/or allow administrators to add new hardware. When demand placed on data storage systems increases, administrators can adjust storage resources to accommodate the change in load.

SUMMARY

Unfortunately, the conventional way that administrators of data storage systems adapt to changes in load is often reactive and occurs too late to avoid service delays. To prevent such delays, administrators can configure their data storage systems with extra capacity, so that they are always prepared for a sudden spike in load. In these cases, however, resources often go underutilized, although they continue to consume power, require cooling, and accrue additional costs.

In contrast with the above-described conventional approach, in which responses to loading spikes are often reactive and occur too late to avoid service delays, an improved technique involves proactively adjusting data storage system configuration in response to detecting external events. The improved technique predicts load changes based on historical correlations between events and load changes and directs an administrator to modify system configurations to prepare for the predicted changes in load. Advantageously, the improved technique enables administrators to better prepare for changes in load brought about by external events and thus to better maintain required service levels. Further, the improved technique reduces need for stressful and urgent responses by system administrators.

One embodiment of the improved technique is directed to a method of configuring resources of a data storage system. The method includes receiving a set of event notifications from a set of notification sources, each of the set of event notifications describing an event external to the data storage system. The method also includes accessing a database that stores correlation scores between event notifications and subsequent loading of the resources of the data storage system to identify a set of correlation scores that the database associates with the received set of event notifications. The method further includes generating a prediction, based on the set of correlation scores accessed from the database, of changes in loading on the resources of the data storage system in response to the received set of event notifications. The method further includes changing a configuration of the resources of the data storage system in response to the prediction of changes in loading on the resources of the data storage system to proactively prepare for changes in loading on resources based on historical correlations.

Additionally, some embodiments of the improved technique are directed to an apparatus constructed and arranged to configure resources of a data storage system. The apparatus includes memory and a set of processors coupled to the memory to form controlling circuitry. The controlling circuitry is constructed and arranged to carry out a method of configuring resources of a data storage system.

Furthermore, some embodiments of the improved technique are directed to a computer program product having a non-transitory computer-readable storage medium which stores code including a set of instructions which, when executed by a data storage system, cause the data storage system to carry out a method of configuring resources of a data storage system.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves proactively adjusting data storage system configuration in response to detecting external events. The improved technique predicts load changes based on historical correlations between events and load changes and directs an administrator to modify system configurations to prepare for the predicted changes in load. Advantageously, the improved technique enables administrators to better prepare for changes in load brought about by external events and thus to better maintain required service levels. Further, the improved technique reduces need for stressful and urgent responses by system administrators.

Figure 1:
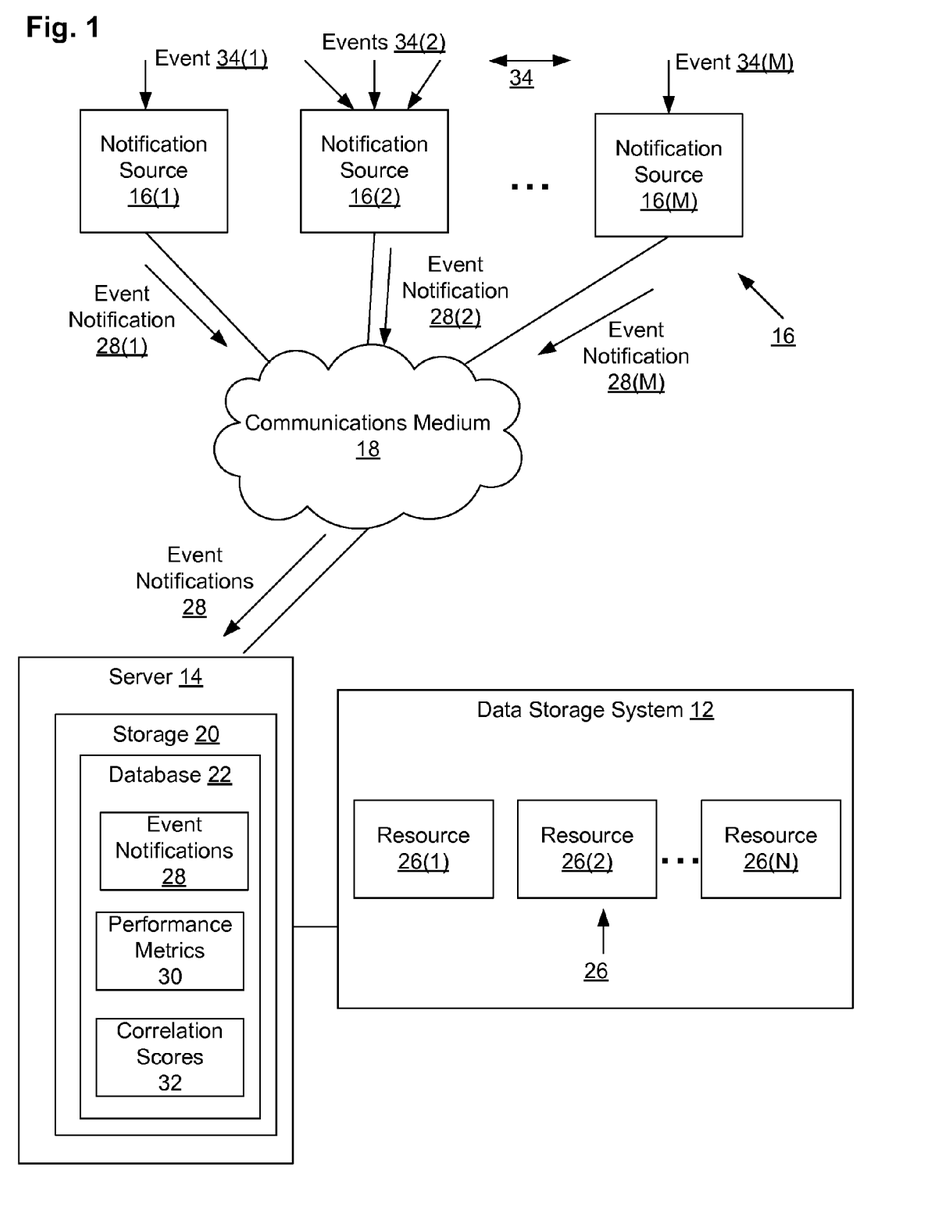
FIG. 1 is a block diagram illustrating an example electronic environment in which the improved technique may be carried out.

FIG. 1 illustrates an example electronic environment 10 in which the improved techniques hereof can be carried out. Electronic environment 10 includes data storage system 12, server 14, notification sources 16(1), 16(2), . . . , 16(M), and communications medium 18.

Data storage system 12 is constructed and arranged to store and provide access to data. Data storage system 12 includes resources 26(1), 26(2), . . . , 26(N), where N is the number of such resources (resources 26).

Resources 26 may each be an individual disk, a set of LUNS, a storage processor, or the like. For example, suppose resources 26(1) may be a set of LUNS which stores data related to an online retailer, while resource 26(2) is another set of LUNS which stores data related to corporate operations. Then utilizations of these LUNS may vary at different times and in response to different events.

Server 14 is constructed and arranged to distribute resources 26 in response to receiving various event notifications 28. Server 14 may be a single server or a group or cluster of servers. Server 14 includes storage, on which database 22 is stored. It should be understood that, in some arrangements, database 22 may be stored externally to server 14. In other arrangements, the server 14 runs within the data storage system 12 (e.g., as a software process, application, etc.) and the database 22 is stored in the storage resources of the data storage system 12.

Database 22 is configured to associate event notifications 28 with performance metrics 30 via a correlation score 32. To this effect, database 22 stores, e.g., in an entry, such as a set of records, an event notification 28, a corresponding set of performance metrics 30, and a corresponding correlation score 32.

Notification sources 16(1), 16(2), . . . , 16(M) (where M is the number of notification sources in electronic environment 10) may be any electronic system or device configured to send event notifications 28 to server 14 via communications medium 18 in response to detecting respective events 34(1), 34(2), . . . , 34(M). For example, event 34(1) may be a command causing the database going into a hot backup mode.

In some arrangements, a notification source, e.g., 16(2), may act as an event aggregator. Such aggregators may be the result of the operation of a security event and incident management (SIEM) system such as enVision™ by EMC Corp. of Hopkinton, Mass., a network forensics system such as Netwitness™ by EMC Corp. of Hopkinton, Mass., or the like. Such an event aggregator as notification source 16(2) aggregates events 34(2) defined by one or more of these systems and produces a single aggregate event notification 28(2). For example, a SIEM system may record events such as changes in incoming traffic to a particular node in a network, while the event aggregator may aggregate the events to a single event 34(2) such as a switch of a client to a server.

Communications medium 18 provides network connections between server 14 and notification sources 16(1), 16(2), . . . , 16(M) (notification sources 16). Communications medium 18 may implement a variety of protocols such as TCP/IP, UDP, ATM, Ethernet, Fibre Channel, combinations thereof, and the like. Furthermore, communications medium 18 may include various components (e.g., cables, wireless, switches/routers, gateways/bridges, NAS/SAN appliances/nodes, interfaces, etc.). Moreover, the communications medium 18 is capable of having a variety of topologies (e.g., queue manager-and-spoke, ring, backbone, multi drop, point to-point, irregular, combinations thereof, and so on).

During operation, notification sources 16 produce respective event notifications 28 in response to detecting respective events 34. For example, one such event notification, e.g., 28(1), provides a notification that a command has issued for a database to go into a hot backup mode. In some arrangements, event notification 28 includes a timestamp indicating when the event 34 took place, e.g., 8 PM.

Upon receiving event notification 28, server 14 accesses database 22 to find entries that have event notifications that match the received event notification 28. In some arrangements, the event notifications are in a standard syntax such that matches can be exact. In other arrangements, however, the matches are not exact but satisfy some matching criterion (e.g., semantic meaning). The result of the matching may be a set of entries having event notifications that match received event notification 28.

It should be understood that the entries of database 22 include, along with event notifications 28, corresponding performance metrics 30. Performance metrics 30 include direct measures and/or computed values of storage parameters, such as disk utilization or storage processor CPU utilization over a period of time.

It should also be understood that there may be many found entries that have matching event notifications 28. Within these found entries, there may be various different performance metrics 30 indicating different levels of activity. Server 14 is configured to compare metrics 30 of found event notifications 28 with currently deployed resources 26 to make sure resources 26 are able to perform at the level of the metrics 30.

Each entry of database 22 also contains a correlation score 32. Correlation score 32 is indicative of a correlation strength between an event notification 28 and performance metrics 30. Consequently, server 14 is configured to select the found entry having the largest correlation score 32. Further, server 14 is further configured to examine the impact of performance metric 30 on the performance of data storage system 12. In some arrangements, the selection of the entry having the largest correlation score 32 and, in effect, particular performance metrics 30, is equivalent to a prediction of a change in usage of resources 26 in response to receipt of even notification 28. The computation of correlation score 32 is described in detail below in connection with FIG. 3.

Based on the prediction, server 14 directs the administrator to change the configuration of data storage system 12 (or changes resources using automated techniques) according to the performance metrics 30 of the selected found entry of database 22. For example, suppose that server 14 receives event notification 28 indicating that a command has been issued for database to go into a hot backup mode. Server 14 finds that the entry of database 22 having such an event notification and the maximum correlation score 32 has corresponding performance metrics indicating a large sequential read workload on a particular set of LUNS within data storage system 12; this would indicate an adjustment of caching and/or data placement across a multi-tiered storage pool in response to receipt of event notification 28.

In some arrangements, event notifications 28 are merely indications of time, i.e., time itself may be an event. For example, the server 14 may record an event notification that it is 8 PM. Over time, the receipt of the 8 PM event notification may become strongly correlated with increase in storage resource usage. In such a case, server 14 may proactively adjust resources 26 in anticipation of the spike, e.g., by increasing available storage just before 8 PM. Further detail about server 14 is described below in connection with FIG. 2.

Figure 2:
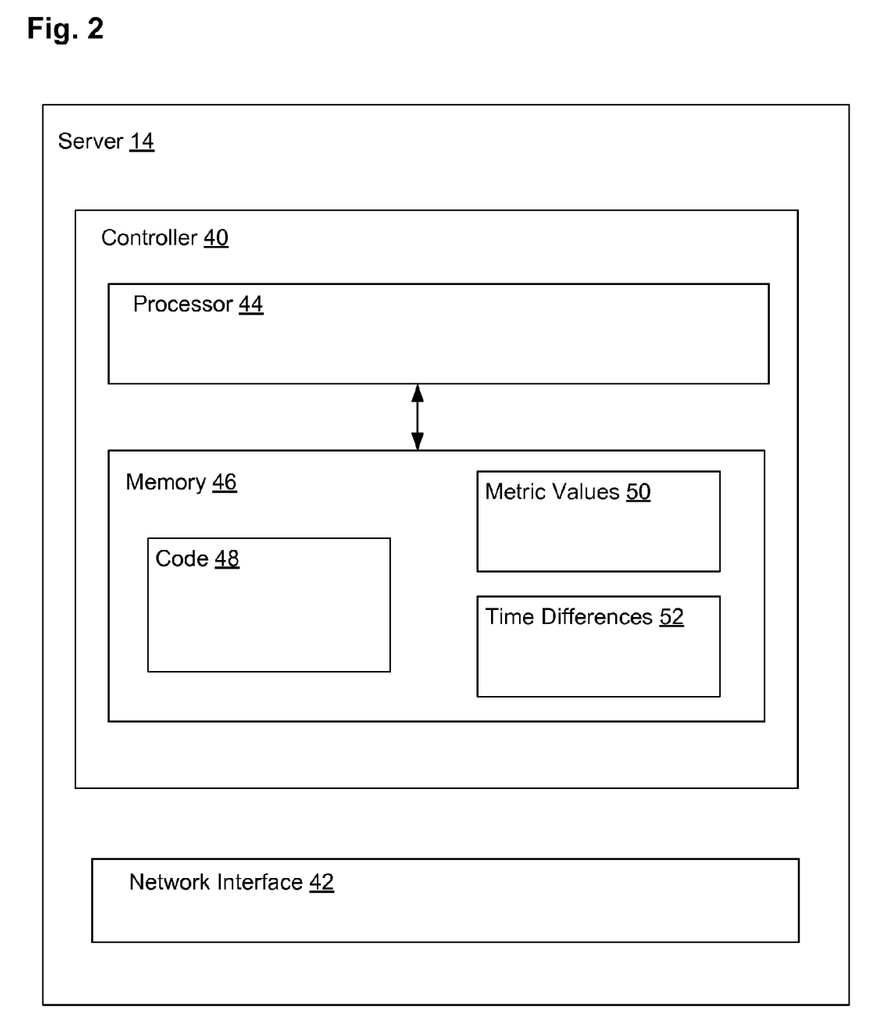
FIG. 2 is block diagram illustrating an example server within the electronic environment shown in FIG. 1.

FIG. 2 illustrates server 14. Server 14 includes controller 40, which in turn includes processor 44 and memory 46, and network interface 42.

Network interface 42 takes the form of an Ethernet card; in some arrangements, network interface 42 takes other forms including that of a wireless receiver or a token ring card, for example.

Memory 46 is configured to store code 48, which includes instructions for implementing the improved techniques. Memory 46 is further configured to store metric values 50 and time differences 52 in the course of computing correlation scores 32. Memory 46 generally takes the form of, e.g., random access memory, flash memory and/or non-volatile memory.

Processor 44 include a single or multiple cores each capable of running single or multiple threads. Processor 44 is coupled to memory 46 and is configured to execute instructions from code 48.

Figure 3:
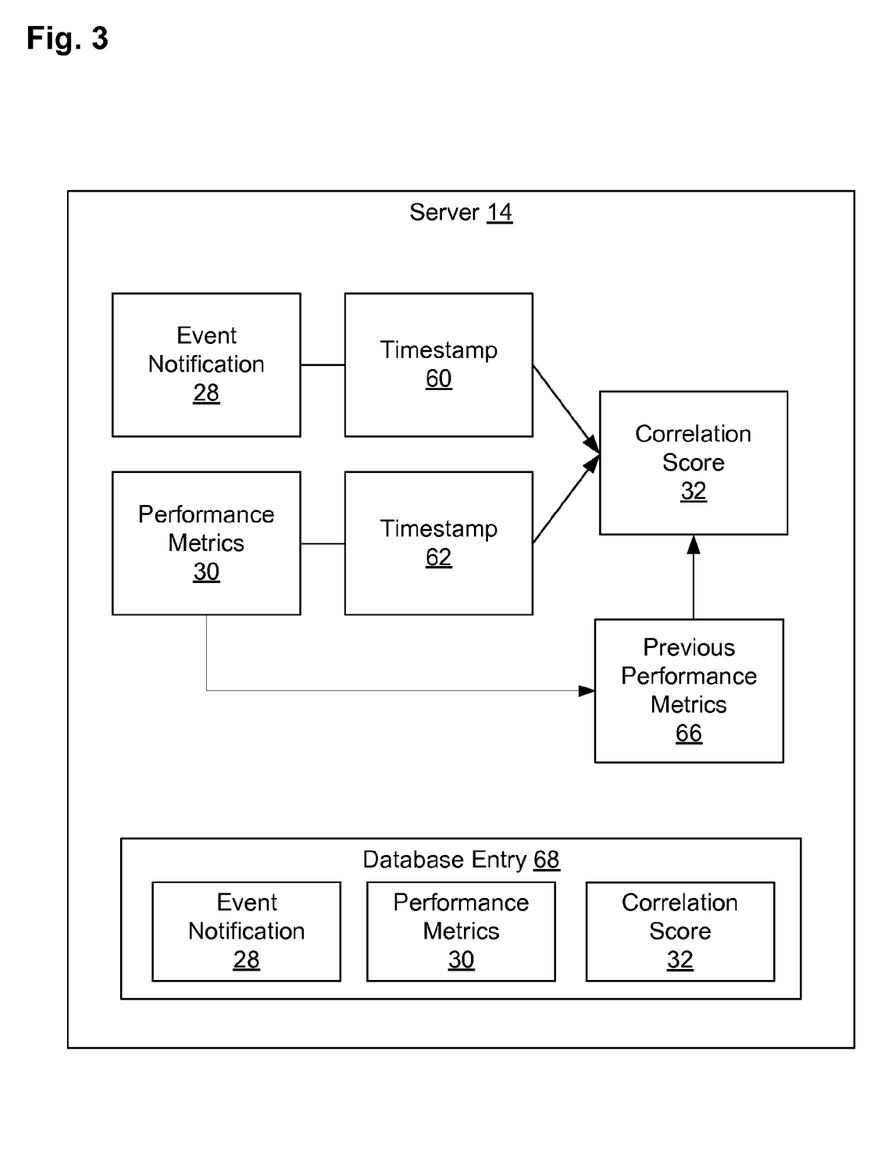
FIG. 3 is a block diagram illustrating an example correlation process within the server shown in FIG. 2.

FIG. 3 illustrates details of an example computation of correlation score 32 by server 14, where larger correlation scores imply a higher likelihood of a causal relationship between event notification 28 and performance metrics 30. As illustrated in FIG. 3, server 14 includes database 22, which in turn includes entries such as database entry 68. As discussed previously in connection with FIG. 1, database entry 68 includes an event notification 28 and performance metrics 30. Upon computation of a correlation score 32 for a given event notification and performance metrics, that correlation score 32 is added to database entry 68.

In an example, server 14 computes correlation score 32 by considering historical behaviors of event notifications 28 and performance metrics 30. Consider a scenario in which server 14 is to compute correlation scores 32 for various event notifications 28 and performance metrics 30. It should be understood that factors in determining causal relationships between event notifications 28 and performance metrics 30 include a change in performance metrics 30 and a time delay between receipt of an event notification and the change in performance metrics.

As illustrated in FIG. 3, server 14 considers performance metrics 30 sampled at a current time, and previous performance metrics 66 sampled at a previous time. The difference between current metrics 30 and previous metrics 66 is one factor used in computing correlation score 32.

Further, event notification 28 includes a first timestamp 60, while current performance metrics includes a second timestamp 62. In computing correlation score 32, server 14 considers a difference between first timestamp 60 and second timestamp 62.

From inputs such as those described above, server 14 uses techniques in data analytics to compute correlation score 32. For example, server 14 may compute correlations between first timestamp 60 and second timestamp 62 as a normalized covariance between these timestamps.

It should be understood that the above-described prediction process may be improved by implementing a machine learning process. Such a process is described in detail below in connection with FIG. 4.

Figure 4:
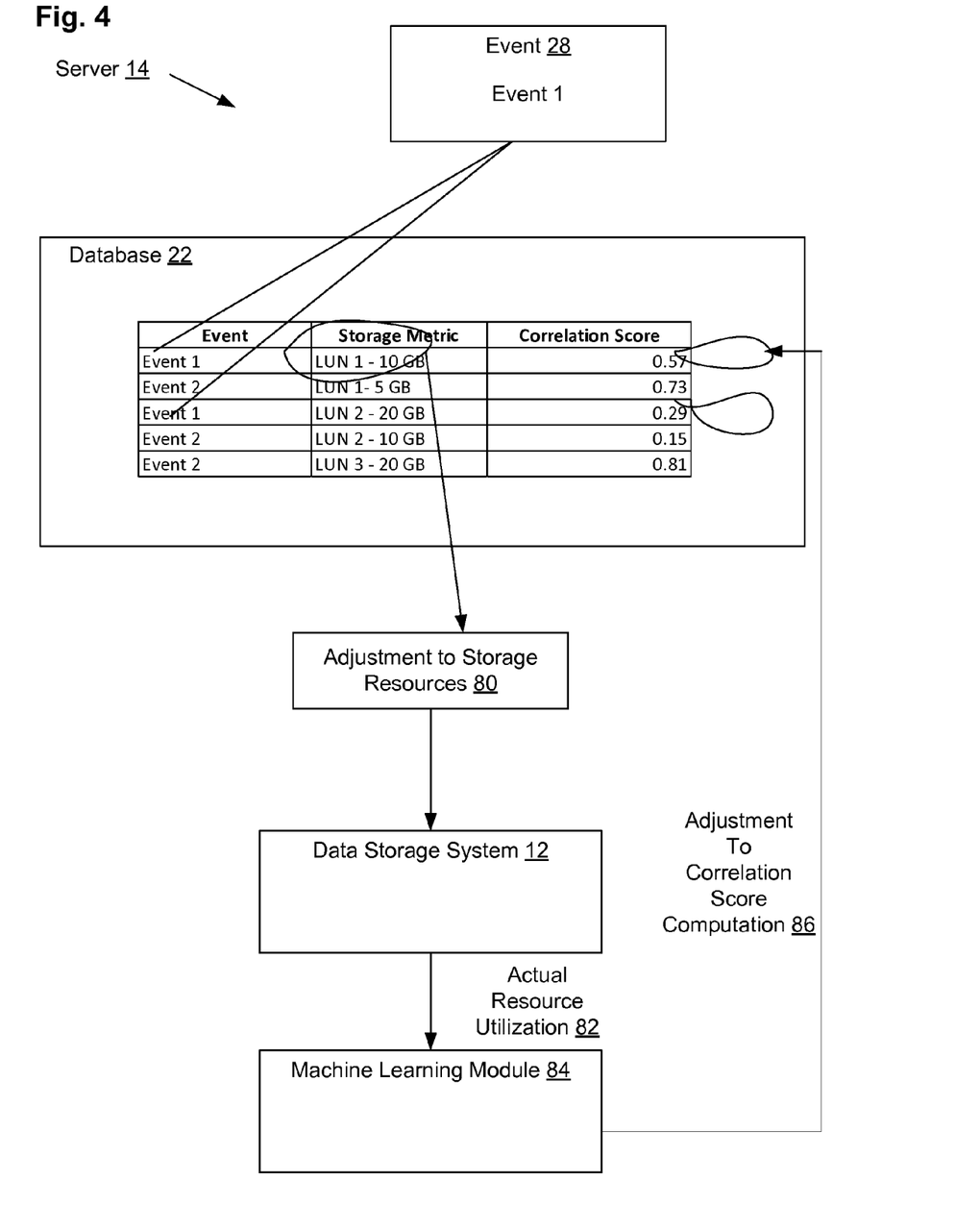
FIG. 4 is a block diagram illustrating an example machine learning process within the server shown in FIG. 2.

FIG. 4 illustrates an example situation in which server 14 receives an event notification 28 ("event 1") and, based on information in database 28, makes a prediction as to the best use of resources 26 within data storage system 12. As illustrated in FIG. 4, server 14 performs a lookup within database 22 to find entries having "event 1" as values of an event notification field. As a result of the matching, server 14 finds a pair of entries of database 22: a first entry having storage metric "LUN 1-10 GB" and a second entry "LUN 2-20 GB", each of which represents an allocation of storage space to a particular disk. Server 14 then observes that the former entry has a higher correlation score than the latter and therefore applies 80 resources of data storage system 12 so that the condition "LUN 1-10 GB" is satisfied.

After the adjustment 80 of resources within data storage system 12, server 14 monitors data storage system 12 in order to learn how data storage system 12 performed under the load induced by commands associated with events 34, and compares this actual resource utilization 82 with that predicted 80. For example, while 10 GB was allocated to LUN 1, perhaps 12 GB was actually needed in order to carry out the commands associated with event 34.

Server 14 then inputs actual resource utilization 82 and predicted metrics 80 into a machine learning module 84. Machine learning module 84 is configured to reward good predictions and penalize bad predictions, thus providing a reinforcing 86 of good behavior. Machine learning module 84 may take the form of, e.g., a neural net, a genetic algorithm, or the like.

Figure 5:
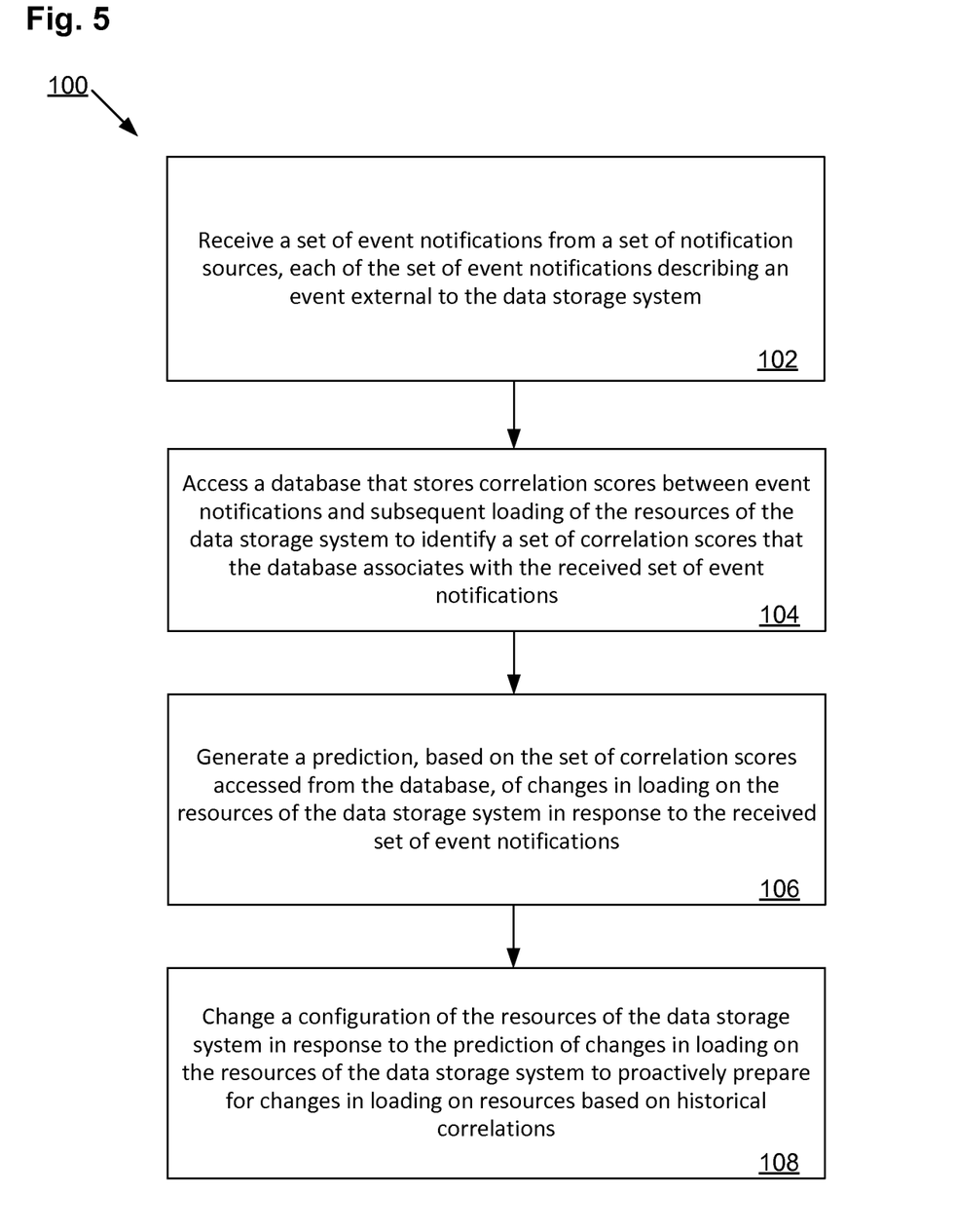
FIG. 5 is a flow chart illustrating an example method of carrying out the improved technique within the electronic environment shown in FIG. 1.

FIG. 5 illustrates a method 100 of configuring resources of a data storage system, including steps 102, 104, 106, and 108. In step 102, a server, e.g., server 14, receives a set of event notifications, e.g., notifications 28, from a set of notification sources, e.g., sources 16, each of the set of event notifications describing an event, e.g., event 34 external to the data storage system, e.g., data storage system 12. In step 104, the server accesses a database, e.g., database 22, that stores correlation scores, e.g., scores 32, between event notifications and subsequent loading of the resources, e.g., resources 26, of the data storage system to identify a set of correlation scores that the database associates with the received set of event notifications. In step 106, the server generates a prediction, based on the set of correlation scores accessed from the database, of changes in loading on the resources of the data storage system in response to the received set of event notifications. In step 108, changing a configuration of the resources of the data storage system in response to the prediction of changes in loading on the resources of the data storage system to proactively prepare for changes in loading on resources based on historical correlations.

As used throughout this document, the words "comprising," "including," and "having" are intended to set forth certain items, steps, elements, or aspects of something in in that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the above discussion has dealt mainly with server 14 on which database 22 is stored. In some arrangements, however, database 22 is stored remote from server 14.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of configuring resources of a data storage system, the method comprising:

receiving a set of event notifications from a set of notification sources, each of the set of event notifications describing an event external to the data storage system;
accessing a database that stores correlation scores between event notifications and subsequent loading of the resources of the data storage system to identify a set of correlation scores that the database associates with the received set of event notifications;
generating a prediction, based on the set of correlation scores accessed from the database, of changes in loading on the resources of the data storage system in response to the received set of event notifications; and
changing a configuration of the resources of the data storage system in response to the prediction of changes in loading on the resources of the data storage system to proactively prepare for changes in loading on resources based on historical correlations.

2. A method as in claim 1, further comprising after receipt of the event notifications:
detecting levels of utilization of the resources of the data storage system; and
receiving additional event notifications.

3. A method as in claim 2, further comprising:
generating performance metrics that indicate the detected levels of utilization of the resources of the data storage system that follow receipt of the event notifications; and
storing the performance metrics in the database.

4. A method as in claim 3,
wherein storing the performance metrics in the database includes:
for each event notification of the set of event notifications, storing that event notification in an entry of a database, each entry of the database including corresponding performance metrics and a corresponding correlation score.

5. A method as in claim 3, further comprising:
prior to receiving the event notifications, computing correlation scores indicating correlations between i) the event notifications and ii) the performance metrics.

6. A method as in claim 5,
wherein computing the correlation scores includes:
recording, in the database, a subsequent change in value of each of the set of performance metrics, and
for each of the set of storage metrics, computing the correlation score based on the change in value of the performance metric.

7. A method as in claim 6,
wherein computing the correlation scores further includes, for each of the event notifications:
generating a time difference between a time at which that event notification was received and a time at which the subsequent change in value of the corresponding performance metric occurred;
wherein the correlation score is further based on the time difference.

8. A method as in claim 3,
wherein generating the prediction of changes in loading on the resources of the data storage system in response to the received set of event notifications includes:
locating entries of the database in which the event notifications of the entries matches the received event notification;
obtaining the entry of the located entries in which the correlation score is larger than a threshold score, and
directing an administrator to change the resources of the data storage system according to the corresponding performance metrics stored in the obtained entry.

9. A method as in claim 8, further comprising:
recording actual level of utilization of the set of resources of the data storage system; and
inputting whether actual level of utilization of the set of resources has improved system performance metrics into a machine learning model.

10. A method as in claim 3,
wherein a notification source of the set of notification sources is a point of aggregation of notifications of external events configured to produce a single event notification describing several external events; and
wherein the method further comprises:
storing the single event notification in an entry of the database.

11. An electronic apparatus constructed and arranged to configure a set of resources of a data storage system, including:
a network interface;
memory; and
a controller including controlling circuitry coupled to the memory, the controlling circuitry being constructed and arranged to:
receive a set of event notifications from a set of notification sources, each of the set of event notifications describing an event external to the data storage system;
access a database that stores correlation scores between event notifications and subsequent loading of the resources of the data storage system to identify a set of correlation scores that the database associates with the received set of event notifications;
generate a prediction, based on the set of correlation scores accessed from the database, of changes in loading on the resources of the data storage system in response to the received set of event notifications; and
change a configuration of the resources of the data storage system in response to the prediction of changes in loading on the resources of the data storage system to proactively prepare for changes in loading on resources based on historical correlations.

12. An apparatus as in claim 11, wherein the controlling circuitry is further constructed and arranged to, after receipt of the event notifications:
detect levels of utilization of the resources of the data storage system; and
receive additional event notifications.

13. An apparatus as in claim 12, wherein the controlling circuitry is further constructed and arranged to:
generate performance metrics that indicate the detected levels of utilization of the resources of the data storage system that follow receipt of the event notifications; and
store the performance metrics in the database.

14. An apparatus as in claim 13,
wherein the controlling circuitry constructed and arranged to store the performance metrics in the database is further constructed and arranged to:
for each event notification of the set of event notifications, store that event notification in an entry of a database, each entry of the database including corresponding performance metrics and a corresponding correlation score.

15. An apparatus as in claim 13, wherein the controlling circuitry is further constructed and arranged to:
  prior to receiving the event notifications, compute correlation scores indicating correlations between i) the event notifications and ii) the performance metrics.

16. An apparatus as in claim 15,
  wherein the controlling circuitry constructed and arranged to compute the correlation scores is further constructed and arranged to:
    record, in the database, a subsequent change in value of each of the set of performance metrics, and
    for each of the set of storage metrics, compute the correlation score based on the change in value of the performance metric.

17. An apparatus as in claim 16,
  wherein the controlling circuitry constructed and arranged to compute the correlation scores is further constructed and arranged to, for each of the event notifications:
    generate a time difference between a time at which that event notification was received and a time at which the subsequent change in value of the corresponding performance metric occurred;
    wherein the correlation score is further based on the time difference.

18. An apparatus as in claim 13,
  wherein the controlling circuitry constructed and arranged to generate the prediction of changes in loading on the resources of the data storage system in response to the received set of event notifications is further constructed and arranged to:
    locate entries of the database in which the event notifications of the entries matches the received event notification;
    obtain the entry of the located entries in which the correlation score is larger than a threshold score, and
    direct an administrator to change the resources of the data storage system according to the corresponding performance metrics stored in the obtained entry.

19. An apparatus as in claim 18, wherein the controlling circuitry is further constructed and arranged to:
  record actual level of utilization of the set of resources of the data storage system;
  input whether actual level of utilization of the set of resources has improved system performance metrics into a machine learning model.

20. A computer program product having a non-transitory, computer-readable storage medium which stores instructions that, when executed by a controller, cause the controller to carry out a method of configuring resources of a data storage system, the method comprising:
  receiving a set of event notifications from a set of notification sources, each of the set of event notifications describing an event external to the data storage system;
  accessing a database that stores correlation scores between event notifications and subsequent loading of the resources of the data storage system to identify a set of correlation scores that the database associates with the received set of event notifications;
  generating a prediction, based on the set of correlation scores accessed from the database, of changes in loading on the resources of the data storage system in response to the received set of event notifications; and
  changing a configuration of the resources of the data storage system in response to the prediction of changes in loading on the resources of the data storage system to proactively prepare for changes in loading on resources based on historical correlations.

21. A method as in claim 1, wherein the resources of the data storage system include a LUN, and wherein changing a configuration of the resources of the data storage system include changing an allocation of storage space to the LUN to proactively prepare for changes in loading on the LUN based on historical correlations for the LUN.

22. A method as in claim 21, wherein the set of notification sources includes a security event and incident management system (SIEM) that aggregates network forensic events external to the data storage system and reports such events as single aggregated events.

* * * * *